3,136,635
TANTALUM BASE ALLOYS
Alexander L. Field, Jr., Pittsburgh, Pa., Allen I. Lewis, deceased, late of Forest Hills, Pa., by Bernard J. Ambrose, administrator, Monroeville, Pa., and Robert L. Ammon, Pleasant Hills, Pa., assignors to Westinghouse Electric Corporation, East Pittsburgh, Pa., a corporation of Pennsylvania
No Drawing. Filed Jan. 17, 1962, Ser. No. 167,474
3 Claims. (Cl. 75—174)

The present invention relates to tantalum base alloys suitable for use where high strength and ductility at either sub-zero or elevated temperatures is required.

Fabricable alloys possessing strength and ductility at extremely high and extremely low temperatures have many industrial and military applications. These characteristics are required by designers and fabricators of aerospace vehicles and power plants where such properties have become unobtainable with existing materials of construction.

In accordance with this invention, it has been found that workable tantalum base alloys are potentially useful for extremely high temperature operation, considering the high melting point of the pure metal (5430° F.) and the slow reduction of strength with increasing temperature within the range of 2000° to 3000° F. and the unusually high strength and ductilities at temperatures as low as −320° F.

The object of the invention is to provide a readily workable cast member which possesses high strength and ductility at both elevated and sub-zero temperatures, comprising predetermined proportions of rhenium and tungsten, the balance, over 50% by weight being tantalum, with small amounts of incidental impurities.

Other objects of the invention will, in part, be obvious and will, in part, appear hereinafter.

In accordance with the present invention, wrought members have been produced from a cast member comprising a ternary tantalum base alloy comprising, by weight, from 1 to 5% rhenium, from 2 to 15% tungsten and the balance tantalum with small amounts of incidental impurities. The alloys are characterized by relatively high strength at elevated temperatures and relatively good ductility at room and sub-zero temperatures. In a preferred embodiment, the alloys of this invention comprise from 2 to 4% by weight rhenium, from 4 to 8% by weight tungsten and the balance being tantalum, with small amounts of incidental impurities. Incidental impurities and small amounts of additives may include hafnium, zirconium, cobalt, nickel and iron in amounts less than 1%. The alloy may be melted by one of several procedures which will ensure homogeneity and a minimum of contamination. For example, unalloyed high-purity tantalum together with proper amounts of pure rhenium and tungsten can be fed into a conventional non-consumable arc melting furnace containing an inert atmosphere, such as argon, or in a vacuum. The resulting ingot should be remelted several times, preferably by consumable arc melting it, to achieve homogeneity, then it may be hot worked to the desired shape. The alloy may also be prepared by pressing together powders of tantalum, tungsten and rhenium and consumably arc melting the same. Levitation melting of a ball or rod of the alloy, using induction heating, or electron beam melting is also satisfactory.

The following example is illustrative of the present invention.

An alloy of the following composition was prepared by consumable arc melting: 96% tantalum, 2% rhenium and 2% tungsten. The electrode was prepared by blending 20 mesh powders of tantalum, tungsten and rhenium by suitable mechanical mixing, then compacting the mixture into bars at 50 tons per square inch pressure and finally sintering the bar in a vacuum at 3000° F. for two hours. The bar is then melted in a conventional consumable arc melting furnace under vacuum of less than 1 micron pressure using 60 cycle single phase A.C. power at 2800 amperes and 20 volts for a ¾ inch by ¾ inch cross-section electrode. The melting rate was from 1.3 to 1.7 pounds per minute. The resulting billet, coated with a glass for lubrication and oxidation protection was extruded at a temperature of 3100° F. at a pressure of 1600 p.s.i. The billet was then rolled at 2200° F. with 10% to 15% reduction per pass. The resulting sheet or strip was then stress-relieved for one hour at 2015° F. Samples were cut from the resulting strip and were tested at temperatures ranging from −320° F. to 2700° F. for ultimate tensile strength, yield strength, percent elongation and percent reduction in area. The following results were obtained:

| Test Temp. (° F.) | Ultimate Tensile Strength (p.s.i.) | 0.2% Yield Strength (p.s.i.) | Percent Elongation | Percent Reduction in Area |
|---|---|---|---|---|
| −320 | 190,000 | 188,000 | 8 | 56 |
| −150 | 147,000 | 145,000 | 22 | 71 |
| 75 | 123,000 | 123,000 | 18 | 74 |
| 2,200 | 57,000 | 51,000 | 14 | 56 |
| 2,500 | 27,300 | 23,400 | 24 | 55 |
| 2,700 | 15,200 | 13,600 | 54 | 67 |

It will be evident from these tests that the alloy has a relatively high strength and ductility at both sub-zero and at elevated temperatures.

Other alloys containing from 1 to 5% rhenium and from 2 to 15% tungsten, balance tantalum may be prepared with good properties.

It should be understood that the above description is only exemplary and not in limitation of the invention.

We claim as our invention:

1. A readily workable member comprising a tantalum base alloy consisting essentially of by weight from 1 to 5% rhenium, from 2 to 15% tungsten and the balance tantalum with small amounts of incidental impurities, the cast member being characterized by relatively high strength at elevated temperatures and by relatively good ductility at room and sub-zero temperatures.

2. A readily workable member comprising a tantalum base alloy consisting essentially of by weight 2 to 4% rhenium, from 4 to 8% tungsten and the balance tantalum with small amounts of incidental impurities, the cast member being characterized by relatively high strength at elevated temperatures and by relatively good ductility at room and sub-zero temperatures.

3. A readily workable member comprising a tantalum base alloy consisting essentially of by weight 2% rhenium, 2% tungsten and the balance tantalum with small amounts of incidental impurities, the cast member being characterized by relatively high strength at elevated temperatures and by relatively good ductility at room and sub-zero temperatures.

References Cited in the file of this patent

UNITED STATES PATENTS

| 1,612,459 | Maurer | Dec. 28, 1926 |
| 1,701,299 | Engle | Feb. 5, 1929 |
| 2,234,969 | Hensel et al. | Mar. 18, 1941 |

FOREIGN PATENTS

| 1,007,185 | France | Feb. 6, 1956 |